United States Patent Office 3,535,332
Patented Oct. 20, 1970

3,535,332
PRODUCTION OF VINYL OXAZOLINE ESTERS
Wallace F. Runge and John A. Frump, Terre Haute, Ind., assignors to Commercial Solvents Corporation, New York, N.Y., a corporation of Maryland
No Drawing. Filed Mar. 11, 1968, Ser. No. 711,879
Int. Cl. C07d 85/36
U.S. Cl. 260—307                                                   1 Claim

ABSTRACT OF THE DISCLOSURE

An improved process for the production of a 2-vinyl oxazoline ester by condensation of a 2-alkyl oxazoline ester with formaldehyde at a temperature of 140–200° C., with subsequent dehydration of the condensation product by heating said product to a temperature of 185–186° C. at a rate of from 1.0 to 2.0° C. per minute, maintaining the temperature at 185–186° C. and removing water of reaction as an azeotrope.

BACKGROUND OF THE INVENTION

This invention relates to the production of oxazoline derivatives. In a particular aspect, it relates to the production of vinyl oxazoline esters by the condensation of formaldehyde with an oxazoline ester.

It is known in the art that oxazoline esters corresponding to Formula I:

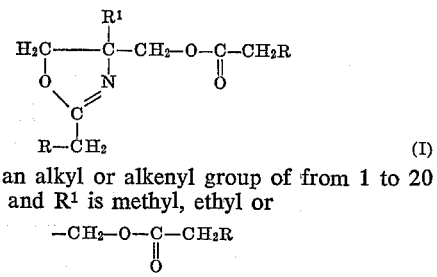

wherein R is an alkyl or alkenyl group of from 1 to 20 carbon atoms and $R^1$ is methyl, ethyl or $$-CH_2-O-\underset{\underset{O}{\|}}{C}-CH_2R$$

can be prepared by reacting a bis- or a trishydroxy aminoalkanol with 2 or 3 moles, respectively, of a saturated or unsaturated aliphatic monocarboxylic acid. According to Purcell, U.S. Pat. 3,248,397, synthetic drying oils are obtained by condensing these ester oxazolines with formaldehyde in about a 1:1.5 mole ratio and at a temperature of up to 140° C. in the presence of an inert atmosphere, such as by sparging nitrogen through the reaction mixture. The temperature is then raised to 190° C.–200° C. to effect dehydration and formation of the vinyl compound. A polymerization inhibitor is usually added to the reaction mixture, and when preferred, a water-immiscible, inert liquid capable of forming an azeotrope with water may be substituted for the nitrogen to assist in removing water of reaction from the reaction mixture. At the lower temperature condensation takes place at the α-carbon atom attached to the carbon atom in the 2-position of the ring, thereby forming a 2-(1-hydroxymethyl) derivative. At the higher temperature dehydration of the hydroxy compound accurs to produce a 2-(1-ethenyl alkyl or alkenyl) ester oxazoline—which is sometimes designated as a vinyl oxazoline ester—corresponding to Formula II

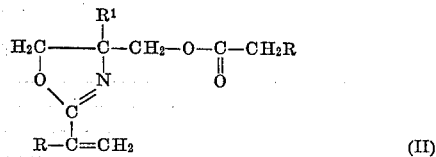

where R and $R^1$ have the same meaning described above.

Products of this type, especially those from unsaturated fatty acids, are useful as synthetic vehicles for the formulation of both baking type and air-drying paints, varnishes and other coatings.

This process has been very successful and commercial products have been well accepted. However, some variation in quality from batch to batch with no obvious variation in process conditions has occurred. It has been found that by-products and incomplete conversions lead to variations in the performance of the dried coatings in which the vinyl oxazoline esters are used as the vehicle. Separation of the objectionable fractions is difficult to achieve because, like the principal product, they are high-boiling and their boiling points lie close together.

The principal by-product has been identified as a divinyl compound corresponding to Formula III:

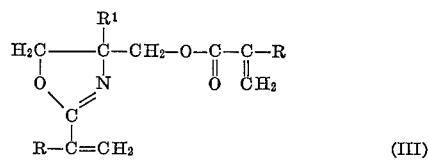

where R and $R^1$ have the same meaning described above. Compousds of this type are objectionable in coatings vehicles because they tend to form cross-linking polymers which are hard and poorly soluble in the usual solvents. Such compounds do, however, have utility as molding resins.

Other components include 2(1-ethenyl alkyl or alkenyl)-4-alkyl or hydroxymethyl-4-hydroxymethyl oxazoline resulting from hydrolysis of the ester, unreacted ester oxazoline starting compound, unconverted condensation products, and color bodies. It is desirable to minimize such components both individually and collectively to obtain the full advantages of the synthetic vehicles.

SUMMARY OF THE INVENTION

It is an object of this invention to provide an improved process for the production of oxazoline derivatives.

It is another object of this invention to provide an improved process for the production of 2-(1-ethenyl alkyl or alkenyl) oxazoline esters of relatively high purity.

A third object of this invention is a method for the production of compositions having a low proportion of unreacted oxazoline ester, unconverted formaldehyde condensation product, vinyl oxazoline alcohol resulting from hydrolysis of the vinyl oxazoline ester, and divinyl compounds corresponding to Formula III above.

It is the discovery of this invention that compounds corresponding to Formula II can be produced in relatively high purity and having a light color, characteristics previously obtained only by laborious distillation at very low pressures, a step found impractical for commercial products.

The improved process of this invention comprises discontinuing the sparging of inert gas, maintaining a critical rate of heating between 1° and 2° C. per minute, controlling the volume of the azeotrope-former, and effecting the step of dehydration at 185° C., which is somewhat lower than the temperatures of the prior art.

DETAILED DISCUSSION

In carrying out the process of this invention, an oxazoline ester corresponding to Formula I set forth above is charged to a reaction vessel equipped with an agitation means, a temperature sensing device and a decanter head with a reflux condenser. About 1 to 2 or more molar equivalents of a formaldehyde source, preferably paraformaldehyde, is added with agitation and the mixture is heated to within about 120° C. to 140° C. If aqueous formaldehyde or an alcoholic solution is used, the water or alcohol is removed by distillation. Heat input is controlled to maintain the mixture below about 140° C. until all paraformaldehyde, when used, has dissolved. The azeotrope-former, preferably xylene, about 5% by volume, and a polymerization inhibitor, about 0.01% to 0.1% by weight, are added and the mixture is heated to 185°–186°, at a rate of about 1°–2°, preferably 1.5° to 2.0° per minute.

When the pot temperature has reached 185°, additional azeotrope-former sufficient to provide good reflux is added and heating is continued until elimination of water of reaction is complete, e.g. for about 4 hours. The water of reaction is separated from the azeotrope-former in the distillate in a decanter. The water is removed and the azeotrope-former is returned to the pot. Excess formaldehyde is eliminated either by vaporization during the heat-up to 185° or by codistillation with the water of reaction.

When water of reaction is no longer being eliminated, the azetrope-former is removed by distillation and the crude product, the vinyl oxazoline ester, is suitable for use as is or can be vacuum distilled to obtain a purified material.

The oxazoline ester starting material represented by Formula I used in the practice of this invention can be provided by any suitable process, many of which are known, or it can be a commercially available material. Preferably, it is of good quality.

The formaldehyde source used in the practice of this invention is preferably 91% paraformaldehyde of good commercial quality. However, formaldehyde can also be provided as the 37% or 44% aqueous solution of commerce, as gaseous formaldehyde, or as a solution in alcohol, in which case the water or alcohol is removed by distillation prior to the condensation step, as set forth above.

From about 0.01% to about 1% of a polymerization inhibitor is employed in the dehydration step. Suitable inhibitors include di-beta-naphthol, hydroquinone, p-hydroxydiphenylamine, N,N'-diphenyl-phenylenediamine, 2,5-di-tert.-butylhydroquinone, trinitrotoluene, copper carbonate, methylene blue and butylated hydroxytoluene.

Suitable inert liquids for forming the azetrope with water include benzene, toluene, xylene, mesitylene and the butoxy ether of ethylene glycol. The azetrope-former is preferably immiscible with water so that it can be readily returned to the reaction vessel from the decanter and does not react with the other reactants. Xylene is the preferred azetrope-former.

One feature of the present invention is a provision for a process for the production of a divinyl oxazoline ester corresponding to Formula III. According to this process, 2 to 3 or more molar equivalents of formaldehyde are used per mole of oxazoline ester. The oxazoline ester and formaldehyde from a formaldehyde source are reacted at a temperature of 120–140° C. When the reaction is complete, a polymerization inhibitor and sufficient azetrope-former to establish reflux are added. When preferred, an inert gas, e.g. nitrogen, is sparged through the reaction mixture in place of the azetrope former. If the formaldehyde source is paraformaldehyde, the heating period is continued until the paraformaldehyde has dissolved, e.g. for about 30 to 60 minutes, then the temperature is slowly increased to 185 to 195° C., preferably 190–195° C. at a rate of less than 1°/minute, preferably 0.25 to 0.75°/minute. The reaction mixture is maintained at about 195° C. until water of reaction is no longer coming off, e.g. for about four hours, and the reaction is then determined to be complete. The azetrope-former is then separated by distillation and the product is allowed to cool.

The reaction product is principally a mixture of di- vinyl oxazoline ester and mono-vinyl oxazoline ester. It has utility as is, or the mixture can be separated by vacuum distillation to relatively pure components.

The following examples further illustrate the practice of this invention but it is not intended to be limited thereby. In these examples, the following abbreviations are used:

VOE—vinyl oxazoline ester corresponding to Formula II,
DVOE—divinyl oxazoline ester corresponding to Formula III,
OE—oxazoline ester corresponding to Formula I,
VO—vinyl oxazoline alcohol formed by hydrolysis of the ester group of VOE.

EXAMPLE 1

Preparation of 4-ethyl-4-propionyloxymethyl-2-isopropenyl-2-oxazoline 2,4-Diethyl-4-propionyloxymethyl-2-oxazoline, 852 g. (4 moles) and paraformaldehyde, 198 g. of 91% material (6 moles), were charged to a reaction vessel equipped with an agitator, a thermometer, a decanter and a reflux condenser, and were heated to 120° C. with agitation until the paraformaldehyde dissolved. Xylene, 50 g., and 0.1 g. di-tertiary-butyl hydroquinone were added, and the mixture was carefully heated under reflux to 185° C. at a rate of 1.5 to 2.0°/minute. Another increment of xylene was added and the heating was continued while collecting the xylene-water azeotrope in the decanter head, returning the xylene to the reaction vessel, until the dehydration reaction was complete. The product was vacuum distilled to give a light colored product having the composition:

Percent weight
4 - ethyl - 4 - hydroxymethyl - 2 - isopropenyl - 2-
  oxazoline (VO) _____ 2
4-propionyloxymethyl-2,4-diethyl-2-oxazoline (OE) __ 3
4 - ethyl - 4 - propionyloxymethyl - 2 - isopropenyl - 2-
  oxazoline (VOE) _____ 92
4 - (2 - ethenylpropionyloxymethyl) - 4 - ethyl - 2-
  isopropenyl-2-oxazoline (DVOE) _____ 3

EXAMPLES 2–4

The experiment of Example 1 was repeated employing a heating rate of 1.75°/minute from 120° to 185° C. In the following examples, the amount of xylene added was varied.

| Example No. | Xylene, g. | Time at 185° C., hours | Product distribution, weight percent | | | | Yield VOE, percent |
|---|---|---|---|---|---|---|---|
| | | | VOE | DVOE | VO | OE | |
| 2 | 50 | 4 | 90.9 | 0.8 | 1.9 | 5.9 | 81.2 |
| 3 | 100 | 4 | 89.1 | 0.3 | 1.0 | 8.8 | 80.7 |
| 4 | 200 | 3 | 78.3 | ---- | 1.3 | 16.8 | 64.4 |

EXAMPLE 5

The effect of nitrogen sparge as a substitute for xylene is shown by this example. The result is a composition having relatively high divinyl oxazoline ester content. The experiment of Example 1 was repeated at a heating rate of 2°/minute except that nitrogen was sparged through the reaction continuously until all water of reaction had been released and no azetrope-former was added. The resulting product had the following analysis:

Percent weight
VOE _____ 73
DVOE _____ 15.1
VO _____ 7.1
OE _____ 1.6
Yield of VOE _____ 56.2

EXAMPLES 6–11

The experiment of Example 1 was repeated except that the heating rate and dehydration period were varied.

| Example No. | Heating rate, deg./min. | Heating time at 185° C., hrs. | Mole ratio | Product distribution, wt. percent | | | | Yield VOE, percent |
|---|---|---|---|---|---|---|---|---|
| | | | | VOE | DVOE | VO | OE | |
| 6 | 0.75 | 3.0 | 1.25 | 86.6 | 4.3 | 3.9 | 4.4 | 72.7 |
| 7a | 1.0 | 3.0 | 1.25 | 89.2 | 0.9 | 2.3 | 6.9 | 79.8 |
| 7b | 1.0 | 3.0 | 1.35 | 88.5 | 1.9 | 3.0 | 5.6 | 77.1 |
| 8 | 1.25 | 3.0 | 1.5 | 90.1 | 0.6 | 1.9 | 6.8 | 80.6 |
| 9a | 1.5 | 3.0 | 1.5 | 89.8 | 4.5 | 2.9 | 1.8 | 75.4 |
| 9b | 1.5 | 3.25 | 1.25 | 90.0 | 1.3 | 1.9 | 6.5 | 80.1 |
| 10a | 1.75 | 3.5 | 1.5 | 92.3 | 3.2 | 2.2 | 2.0 | 80 |
| 10b | 1.75 | 4.0 | 1.5 | 90.9 | 0.8 | 1.9 | 5.9 | 81.2 |
| 10c | 1.75 | 4.25 | 1.5 | 91.1 | 0.9 | 2.4 | 5.9 | |
| 10d | 1.75 | 4.25 | 1.5 | 92.2 | 2.0 | 2.4 | 3.2 | 76.3 |
| 10e | 1.75 | 4.5 | 1.5 | 91.6 | 2.3 | 2.1 | 3.3 | 76.3 |
| 10f | 1.75 | 4.5 | 1.5 | 89.8 | 0.4 | 1.2 | 8.3 | |
| 11a | 2.0 | 3.0 | 1.25 | 86.8 | 3.5 | 2.9 | 3.9 | 74.9 |
| 11b | 2.0 | 3.25 | 1.5 | 92.2 | 1.7 | 2.1 | 3.8 | 81.8 |
| 11c | 2.0 | 4.0 | 1.5 | 92.2 | 1.7 | 2.0 | 3.7 | 80.6 |

According to these data, improved yields are obtained at a heating rate of 1.0–2.0°/minute, and yields are best at 1.75–2.0 for a dehydration period of 3.5–4.0 hours.

EXAMPLES 12–15

The experiment of Example 1 was repeated except that a 2.1:1 mole ratio of formaldehyde to oxazoline ester (OE) was used and the temperature of dehydration was varied.

| Example No. | Dehydration temperature, °C. | Heating rate, deg./min. | Product distribution, wt. percent | | | | | Yield VEO, percent |
|---|---|---|---|---|---|---|---|---|
| | | | VOE | DVOE | VO | OE | HB [1] | |
| 12a | 165 | 1.3 | 57.1 | | | 18.7 | 21.5 | 55 |
| 12b | 165 | 1.1 | 56.2 | | | 19.4 | 21.9 | 52 |
| 13a | 175 | 1.2 | 88.1 | 1.3 | 1.6 | 3.9 | 4.6 | 80 |
| 13b | 175 | 1.2 | 76.5 | 0.4 | 1.2 | 9.1 | 11.7 | 71 |
| 14a | 185 | 1.9 | 92.7 | 2.8 | 1.9 | 2.0 | 0.2 | 80 |
| 14b | 185 | 1.6 | 92.7 | 1.7 | 1.6 | 2.6 | 0.8 | 80 |
| 15a | 195 | 1.7 | 87.2 | 6.7 | 3.3 | 0.8 | 0.4 | 66 |
| 15b | 195 | 1.7 | 80.0 | 12.0 | 4.9 | 1.1 | 0.6 | 59 |
| 15c | [2] 195 | 1.7 | 80.7 | 11.7 | 4.2 | 0.7 | 0.7 | 64 |
| 15d | [2] 195 | 1.7 | 78.8 | 12.7 | 4.8 | 0.7 | 0.9 | 62 |

[1] High boiling residue, principally unconverted condensation product of OE with formaldhyde.
[2] 2 hours.

NOTE.—Dehydration time 4 hours; 2.1:1 mole ratio.

Low dehydration temperature favors incomplete conversion of OE to condensation product and incomplete conversion of condensation product to VOE. High temperature favors formation of DVOE and VO.

EXAMPLE 16

Preparation of divinyl oxazoline ester 2,4-diethyl-4-propionyloxymethyl-2-oxazoline, 852 g. (4 moles), and paraformaldehyde, 91%, 276 g. (836 moles), were charged to a 2-liter, round-bottom flask equipped with an agitator, thermometer (liquid and vapor) and a decanter head with water-cooled condenser. The reaction mixture was heated from room temperature to 120° C. in about 45 minutes and heating at 120° C. was continued until the paraformaldehyde was dissolved (about 30 minutes). 2,5-di-tertiary-butylhydroquinone, 0.10 g., was added and the mixture was heated from 120° to 185° in 85 minutes at a uniform heating rate, i.e. about 0.75°/minute. Xylene was added at 140° C. in just sufficient quantity to establish reflux and aid in removal of the water of dehydration. Heating was continued at 185° for three hours. A total of 134 ml. of water and excess formaldehyde was recovered. The crude reaction mixture as analyzed by gas chromatography consisted of 13.5% xylene, 10.6% vinyl oxazoline alcohol, 1.8% oxazoline ester, 27.9% vinyl oxazoline ester, 37.1% divinyl oxazoline ester and 2.1% of a higher boiling compound, probably the intermediate condensation product.

The crude reaction mixture was fractionated under reduced pressure. A large fraction was obtained at 89° C. and a pressure of 300 microns. It was identified as the divinyl oxazoline ester having the following analysis:

Color—Clear, colorless.
Nitrogen found—6.2% wt.
Nitrogen, theoretical—5.9.
Neutral equivalent found—238.5±1.5.
Neutral equivalent, theoretical—237.
Purity by gas chromatography—98.6%.

Infra-red absorption peaks at—1715 cm.$^{-1}$, 1655, 1637, 1610.
Nuclear magnetic resonance—Consistent with expected structure.

The resulting divinyl oxazoline ester was poured into a mold and heated. It polymerized to form a hard, clear, cast resin conforming to the contours of the mold.

EXAMPLE 17

The experiment of Example 16 was repeated except that the reaction mixture was heated to 120° C. in a period of 50 minutes, the temperature was maintained at 120° for 30 minutes, then increased to 185° C. at a rate of 0.75°/minute and maintained at 185° C. for 3 hours. Xylene was added when the temperature reached 162° C. A product having the following composition was obtained:

Percent wt.
Divinyl oxazoline ester _____ 43.2
Vinyl oxazoline ester _____ 34.2
Vinyl oxazoline alcohol _____ 14.3
Oxazoline ester _____ 1.0

EXAMPLE 18

The experiment of Example 16 was repeated except that the reaction mixture was heated to 120° C. in about 30 minutes, then xylene and an alkaline catalyst were added and heating was continued to 185° C. In runs 1, 3 and 4, sufficient sodium methoxide was added to provide 0.25 g. of sodium per mole of oxazoline. In run 2, 0.25 g. of NaOH per mole of oxazoline was added as solid pellets. The following product distribution was obtained:

| Run No. | Catalyst | Heating time at 120° C., min. | Heating rate to 185° C., deg./min. | Product distribution, wt. percent | | | |
|---|---|---|---|---|---|---|---|
| | | | | DVOE | VOE | OE | VO |
| 1[1] | CH₃ONa | 65 | 1.1 | 29.0 | 51.4 | 1.0 | 11.9 |
| 2 | NaOH | 30 | 0.36 | 41.5 | 33.6 | 2.8 | 12.7 |
| 3[2] | CH₃ONa | 45 | 1.1 | 20.4 | 61.2 | 2.0 | 11.9 |
| 4 | CH₃ONa | 60 | 2.1 | 15.2 | 70.7 | 0.8 | 10.2 |

[1] Xylene added at 160° C. instead of 120° C.
[2] Benzene was substituted for xylene.

EXAMPLE 19

The experiment of Example 1 is repeated except that 2-ethyl-4-methyl-1,4-propionyloxymethyl - 2 - oxazoline, 4 moles, is employed as the oxazoline. A high yield of 2-isopropenyl-4-methyl-4-propionyloxymethyl - 2 - oxazoline is obtained.

EXAMPLE 20

The experiment of Example 1 is repeated except that 2-ethyl-4,4-propionyloxymethyl - 2 - oxazoline, 4 moles, is employed as the oxazoline. A high yield of 2-isopropenyl-4,4 - propionyloxymethyl - 2 - oxazoline is obtained.

EXAMPLE 21

The experiment of Example 1 is repeated except that 2-heptadecyl - 4 - methyl - 4 - octadecanoyloxymethyl-2-oxazoline, 4 moles, is employed as the oxazoline. A high yield of 2-(1-ethenylheptadecyl) - 4 - methyl - 4-octadecanoyloxymethyl-2-oxazoline is obtained.

EXAMPLE 22

The experiment of Example 1 is repeated except that 2-heptadecenyl - 4 - methyl-4-octadecenoyloxymethyl-2-oxazoline, 4 moles, is employed as the oxazoline. A high yield of 2-(1-ethenylheptadecenyl) - 4 - methyl-4-octadecoyloxymethyl-2-oxazoline is obtained.

What is claimed is:
1. In a process for the production of a vinyl oxazoline ester corresponding to the formula

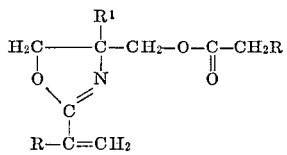

wherein R is an alkyl or alkenyl group of from 1 to 20 carbon atoms and $R_1$ is methyl or ethyl, by condensing at a temperature of about 100° to 140° C. an oxazoline ester corresponding to the formula

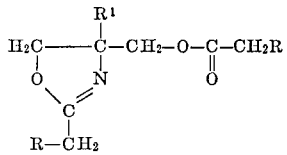

with formaldehyde in about a 1:1–2 or more mole ratio, thereby forming a condensation product, and dehydrating said condensation product at a temperature of 140° to 200° C. in the presence of a polymerization inhibitor, the improvement comprising the steps of
(a) performing said dehydration step at a temperature of 185° C.–186° C. at a rate of from 1.0 to 2.0° C. per minute,
(b) maintaining the temperature at 185° C.–186° C., thereby forming water of reaction, and removing said water as an azeotrope with an inert organic solvent capable of forming an azeotrope with water for a period of time sufficient to effect productiton of said vinyl oxazoline ester.

References Cited
UNITED STATES PATENTS
3,248,379  4/1966  Purcell _____ 260—307

ALEX MAZEL, Primary Examiner
R. V. RUSH, Assistant Examiner

PO-1050
(5/69)

UNITED STATES PATENT OFFICE
CERTIFICATE OF CORRECTION

Patent No. 3,535,332     Dated October 20, 1970

Inventor(s) Wallace F. Runge and John A. Frump

It is certified that error appears in the above-identified patent and that said Letters Patent are hereby corrected as shown below:

Column 1, line 61, "accurs" should be --occurs--.
Column 2, line 27, "compousds" should be --compounds--.
Column 5, in the table, example 7b, 4th column, "1.35" should be --1.25--;
in footnote 1 of the second table, "formaldhyde" should be --formaldehyde--.
Column 7, line 19, "4-methyl-1,4-" should be --4-methyl-4- --.
Column 8, line 34, "productiton" should be --production--.

SIGNED AND
SEALED
MAR 2 1971

(SEAL)
Attest:

Edward M. Fletcher, Jr.
Attesting Officer

WILLIAM E. SCHUYLER, JR.
Commissioner of Patents